W. C. WHITE.
WATER MOTOR.
APPLICATION FILED AUG. 17, 1908.
917,917.
Patented Apr. 13, 1909.
2 SHEETS—SHEET 1.
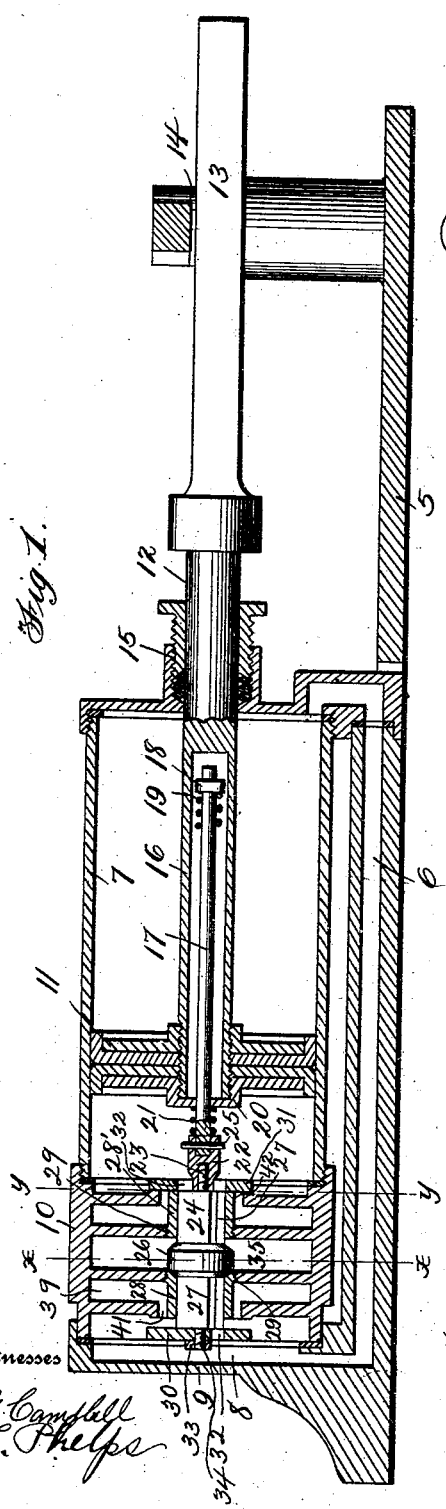
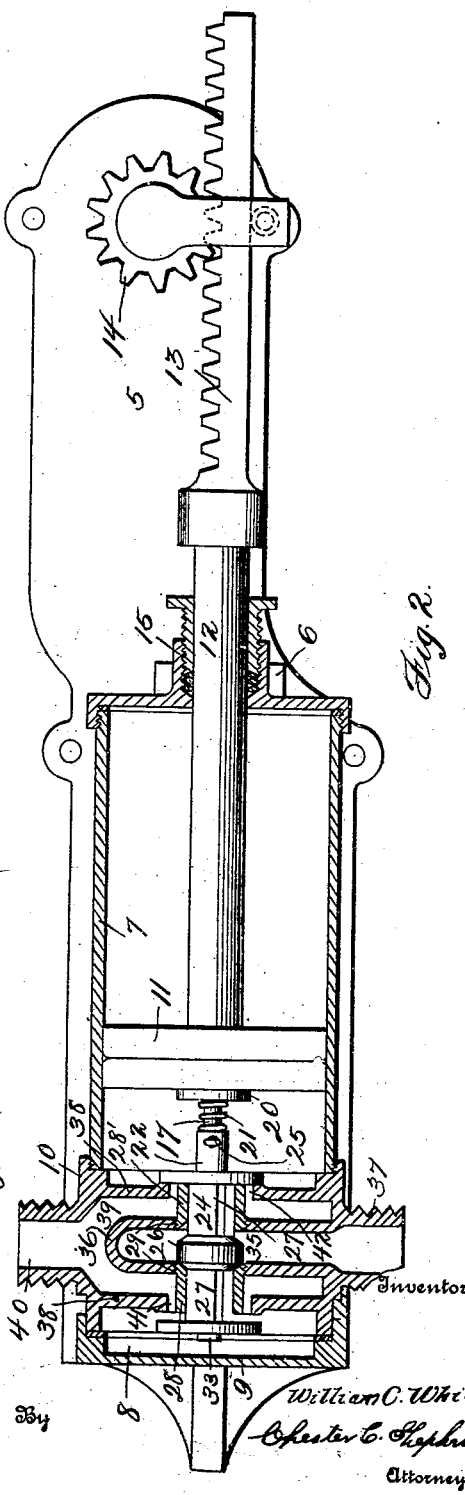
Witnesses
F. G. Campbell
A. L. Phelps
Inventor
William C. White
Chester C. Shepherd
Attorney
By W. C. WHITE.
WATER MOTOR.
APPLICATION FILED AUG. 17, 1908.
917,917.
Patented Apr. 13, 1909.
2 SHEETS—SHEET 2.
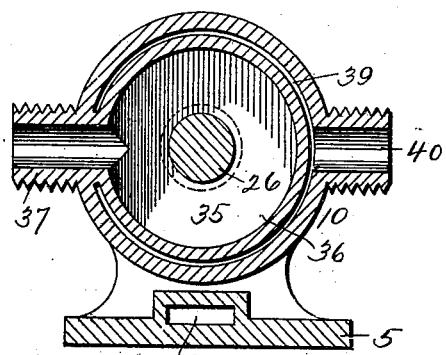
Fig. 3.
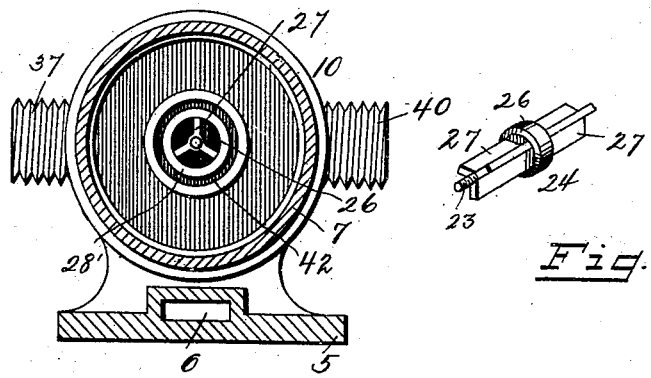
Fig. 4.
Fig. 5.
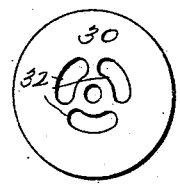
Fig. 6.
Witnesses
Inventor
William C. White
By Chester C. Shepherd
Attorney

UNITED STATES PATENT OFFICE.

WILLIAM C. WHITE, OF COLUMBUS, OHIO.

WATER-MOTOR.

No. 917,917.　　　Specification of Letters Patent.　　　Patented April 13, 1909.

Application filed August 17, 1908. Serial No. 448,943.

*To all whom it may concern:*

Be it known that I, WILLIAM C. WHITE, a citizen of the United States, residing at Columbus, in the county of Franklin and State of Ohio, have invented certain new and useful Improvements in Water-Motors, of which the following is a specification.

My invention relates to water motors, and has for its object the provision of a structure which will be very simple of construction, economical to manufacture, but which will efficiently perform the work required of devices of this class.

Further objects and advantages of the invention will be set forth in the detailed description which now follows.

In the accompanying drawings: Figure 1 is a vertical section of a motor constructed in accordance with the invention, Fig. 2 is a horizontal section of said motor, Fig. 3 is a transverse section upon line x—x of Fig. 1, Fig. 4 is a transverse section upon line y—y of Fig. 1, Fig. 5 is a detail perspective view of the valve hereinafter described, and, Fig. 6 is a detail view of a valve plate hereinafter described.

Like numerals designate corresponding parts in all of the figures of the drawing.

Referring to the drawing, the numeral 5 designates the base of the motor. This base has a by-pass 6 formed therein, which leads from one end of the cylinder 7 to a chamber 8 which is formed between an end plate 9 of the base 5 and a valve casing 10, said valve casing being located between the end plate 9 and the cylinder 7. A piston 11 is slidably disposed in this cylinder and has connected thereto a piston rod 12, the reciprocatory movement of which may be used to perform work of any character. This motor is primarily designed as a washing machine motor and in the drawing I have illustrated a rack bar 13 which meshes with a pinion 14, which pinion may be mounted upon the dasher shaft, not shown, of a washing machine. A packing box 15 of the usual and well known construction, forms a fluid tight joint about the piston rod 12. The piston rod is provided with a bore 16 into which one end of a rod 17 projects. This rod 17 carries a nut 18 and a spring 19 is disposed between this nut and a flange 20 of the piston. A spring 21 is disposed between the flange 20 and a slotted nut 22, said nut being threaded upon the spindle 23 of a valve 24. The end of the rod 17 is connected to this nut by a pin 25. The valve comprises a central annular portion 26 and guide portions 27, said guiding portions being slidably disposed in sleeves 28 and 28' which are threaded into the valve casing at 29.

Plates 30 and 31 are mounted upon the opposite ends of the valve and have ports 32 formed therethrough, which serve a purpose hereinafter described. A nut 33 holds the plate 30 upon a reduced portion 34 of the valve. The central cylindrical portion 26 of the valve is disposed within a chamber 35 which is formed by a wall 36. An inlet nipple 37 is in communication with this chamber. Walls 38 form a chamber 39 around the chamber 35 and an exhaust nipple 40 is in communication with this latter chamber. Openings 41 and 42 are formed in the walls 38 and are of greater diameter than the sleeves 28. An annular port is therefore formed around the sleeves, the port 41 being in communication with the chamber 8 and the port 42 opening into the interior of cylinder 7.

The operation of the device is as follows: With the parts in the position illustrated in Figs. 1 and 2, water enters chamber 35 through the inlet nipple and since the valve 29 at this time closes the entrance to the interior of sleeve 28, the water must flow through sleeve 28' and out of ports 32 to the interior of the cylinder, driving the piston toward the right in Fig. 1. Water at the right hand end of cylinder 7 will at this time be exhausted through by-pass 6, ports 32 of plate 30 and around the edges of said plate to the port 41 and thence to the interior of chamber 39 and exhaust nipple 40. When the piston reaches the end of its stroke toward the right, the flange 20 thereof will engage spring 19 and after said spring has been compressed to a slight degree, the valve will be shifted to close the entrance to sleeve 28' and open the entrance to sleeve 28. This brings the plate 30 into such position as to close the port 41. Water will now flow through sleeve 28 and ports 32 of plate 30 into chamber 8 and thence through by-pass 6 to the right hand end of the cylinder, driving the piston toward the left.

It is apparent that the shifting of the valve will move the plate 31 away from the port 42 and the water in the left-hand end of the cylinder may be exhausted around the edge of said plate and through the port 42, the chamber 39 and thence through exhaust nipple 40.

From the foregoing description, it will be seen that simple and efficient means are herein provided for accomplishing the objects of the invention, but while the elements shown and described are well adapted to serve the purposes for which they are intended, it is to be understood that the invention is not limited to the exact construction set forth, but includes within its purview such changes as may be made within the scope of the appended claims.

What I claim, is:

1. The combination with a cylinder and a piston mounted therein, a valve casing comprising a central chamber and an exhaust chamber surrounding said central chamber, sleeves projecting from the central chamber through the exhaust chamber, a valve slidably disposed in said sleeves and movable transversely of the central chamber, an inlet leading to said central chamber, an outlet leading from the exhaust chamber, there being a port leading from one side of the exhaust chamber to one end of the cylinder and there being a port leading from the other side of the exhaust chamber to the opposite end of the cylinder, and plates connected to the opposite ends of said valve and adapted to alternately close said exhaust ports, said plates having ports formed therethrough.

2. The combination with a cylinder and a piston mounted therein, a valve casing comprising a central chamber and an exhaust chamber surrounding said central chamber, sleeves projecting from the central chamber through the exhaust chamber, a valve slidably disposed in said sleeves and movable transversely of the central chamber, an inlet leading to said central chamber, an outlet leading from the exhaust chamber, there being a port leading from one side of the exhaust chamber to one end of the cylinder and there being a port leading from the other side of the exhaust chamber to the opposite side of the cylinder, plates connected to the opposite ends of said valve and adapted to alternately close said exhaust ports, said plates having ports formed therethrough, and means for shifting said valve at each end of the piston stroke.

3. The combination with a cylinder and a piston mounted therein, a valve casing comprising a central chamber and an exhaust chamber surrounding said central chamber, sleeves projecting from the central chamber through the exhaust chamber, a valve slidably disposed in said sleeves and movable transversely of the central chamber, an inlet leading to said central chamber, an outlet leading from the exhaust chamber, there being a port leading from one side of the exhaust chamber to one end of the cylinder and there being a port leading from the other side of the exhaust chamber to the opposite side of the cylinder, plates connected to the opposite ends of said valve and adapted to alternately close said exhaust ports, said plates having ports formed therethrough, and means for shifting said valve at each end of the piston stroke, said means comprising a hollow piston rod, a rod connected to the valve and projecting into said hollow piston rod, and means carried by the piston for shifting said rod.

4. The combination with a cylinder and a piston mounted therein, a valve casing comprising a central chamber and an exhaust chamber surrounding said central chamber, sleeves projecting from the central chamber through the exhaust chamber, a valve slidably disposed in said sleeves and movable transversely of the central chamber, an inlet leading to said central chamber, an outlet leading from the exhaust chamber, there being a port leading from one side of the exhaust chamber to one end of the cylinder and there being a port leading from the other side of the exhaust chamber to the opposite side of the cylinder, plates connected to the opposite ends of said valve and adapted to alternately close said exhaust ports, said plates having ports formed therethrough, and means for shifting said valve at each end of the piston stroke, said means comprising a hollow piston rod, a rod connected to the valve and projecting into said hollow piston rod, means carried by the piston for shifting said rod, and springs mounted upon said rod with which the piston contacts for the purpose of shifting said rod.

5. In a device of the character described, the combination with a cylinder, a piston mounted in said cylinder, a valve casing threaded upon the rear end of said cylinder, said valve casing being divided by walls into a central inlet chamber and a surrounding exhaust chamber, an outlet from the exhaust chamber, an inlet to the inlet chamber, there being centrally and oppositely disposed ports formed in the opposite walls of the exhaust chamber, one of said ports opening into one end of said cylinder and the other of said ports opening into a chamber which is in communication with the opposite end of said cylinder, sleeves threaded into the wall of the inlet chamber, the outer ends of said sleeves lying flush with the walls of the exhaust chamber, a valve comprising a central annular portion and guiding portions, said guiding portions being slidably disposed in said sleeves, plates mounted upon the outer ends of said valve and adapted to alternately close the exhaust ports, there being ports formed through said plates opposite said sleeves, and means for shifting said valve at each end of the piston stroke.

In testimony whereof I affix my signature in presence of two witnesses.

WILLIAM C. WHITE.

Witnesses:
FRANK G. CAMPBELL,
A. L. PHELPS.